Patented May 11, 1926.

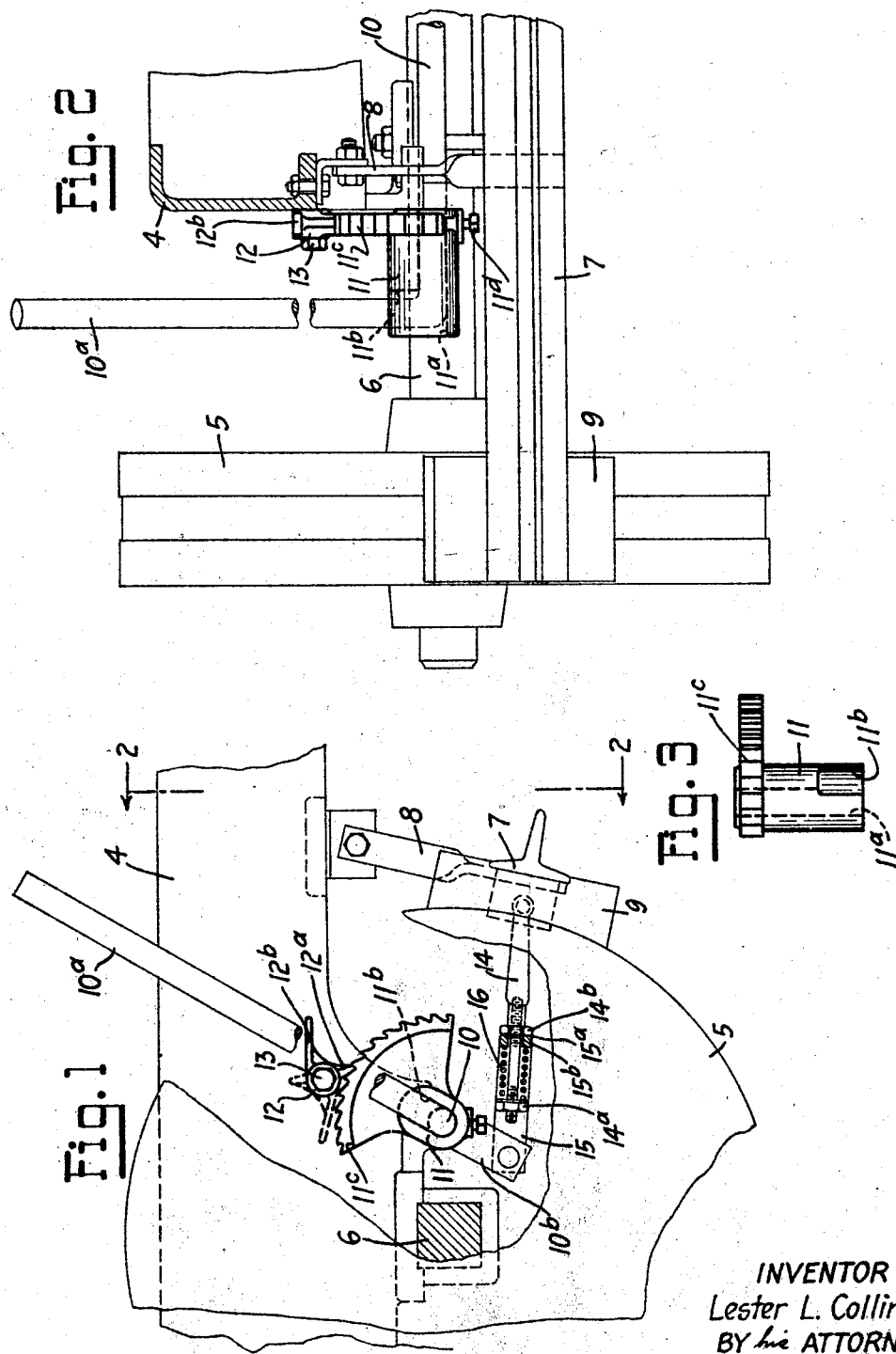

1,584,013

UNITED STATES PATENT OFFICE.

LESTER L. COLLINS, OF FRANKLIN, PENNSYLVANIA, ASSIGNOR TO CHICAGO PNEUMATIC TOOL COMPANY, OF NEW YORK, A CORPORATION OF NEW JERSEY.

BRAKE MECHANISM.

Application filed January 17, 1925. Serial No. 3,188.

This invention relates to devices of the type adapted to control the speed of moving parts or bodies, such as vehicles, engines, etc., such devices being usually known as brakes. Among the objects of the invention are to provide simple but efficient mechanism of the type described which can be manufactured and marketed at a low price, to simplify the means for locking such devices in adjusted operative positions, to provide convenient means for rendering the locking mechanism inoperative without interfering with the functional action of the braking mechanism, and in general to effect economies in the manufacture and assembling of such mechanism without impairing its efficiency.

In order to illustrate the invention one concrete embodiment thereof is shown in the accompanying drawings, in which:

Fig. 1 is a fragmentary side elevational view partly cut away of a vehicle equipped with the invention.

Fig. 2 is a fragmentary sectional view substantially on the line 2—2 of Fig. 1.

Fig. 3 is a plan view of a detail of the invention.

In the embodiment chosen for the purpose of illustrating the invention the same is disclosed as applied to a vehicle of the type used for portable air compressors. The body or "deck" 4 of the vehicle is supported in the usual manner by road wheels 5 rotatably mounted on axles 6. In the present instance the braking mechanism consists of a brake device proper in the form of a bar 7 supported for swinging movement from the body 4 by means of straps 8 and carrying at its extremities brake shoes 9 for frictional engagement with the rims or tires of the road wheels 5, the same being arranged for actuation by a shaft 10 rotatably mounted in suitable bearings on the body 4 and having an operating handle $10^a$. In the form of the invention shown the handle $10^a$ is integral with the shaft 10. The means for locking the operating shaft 10 in any desired adjusted position takes the form of two cooperating members one of which is rotatable with the shaft 10 and the other mounted in a fixed position upon the body 4. The member 11, which is mounted on shaft 10 is in the form of a sleeve having a bore $11^a$ therethrough adapting the same for telescoping engagement over shaft 10. Member 11 has means integral therewith for keying the same to the shaft for rotation therewith, such means as herein disclosed consisting of a recess or slot $11^b$ at the outer end of member 11 extending from the periphery thereof to the bore $11^a$, this slot being arranged to receive the handle $10^a$ as shown in Figs. 1 and 2. In the present instance the member 11 carries a toothed quadrant $11^c$, preferably but not necessarily formed as an integral part of member 11. As indicated in Fig. 2 the member 11 is of such length as to extend from the side of the body or "deck" 4 to or beyond the outer face of handle $10^a$ so that when the parts are assembled no fastening means of any kind is required for member 11. A set screw $11^d$ or other similar means may be used however if desired to keep member 11 from rattling on shaft 10.

The other member of the locking mechanism which in the present form of the invention is the cooperating pawl member 12, is rotatably mounted on a stud or bolt 13 projecting from deck 4 in position to dispose the pawl tooth $12^a$ in position to engage the teeth of the quadrant $11^c$. Pawl 12 has a weighted arm $12^b$ so disposed relative to the tooth $12^a$ as to maintain the member by gravity in either of two positions, the operative position shown in full lines in Fig. 1 wherein the pawl engages the quadrant to hold the shaft in adjusted position until released by manually lifting the pawl, the inoperative position shown in broken lines in Fig. 1 wherein tooth $12^a$ is out of engagement with the teeth of the quadrant and the weighted arm 12<sup>b</sup> rides over the quadrant. It will thus be evident that the locking mechanism is made inoperative by the simple expedient of throwing the pawl member 12 back and that such an operation does not interfere with the functional operation of the brake mechanism itself.

While any suitable connection may be provided between the bar 7 of the brake device proper and the actuating arm 10<sup>b</sup> depending from operating shaft 10, a preferred form of connection is illustrated in Fig. 1 and comprises telescoping members 14 and 15 pivotally connected to bar 7 and arm 10<sup>b</sup> respectively, the member 14 being at least partly in the form of a rod extending through an opening 15<sup>a</sup> in an angularly disposed portion 15<sup>b</sup> of member 15 and having a stop 14<sup>a</sup> forming an abutment for one end of a coil spring 16, the other end engaging portion 15<sup>b</sup> of member 15, whereby members 14 and 15 are yieldingly urged into and retained in telescoping engagement. The stop 14<sup>a</sup> is preferably in the form of a nut in threaded engagement with the outer end of member 14 to provide for adjustment of the tension of spring 16. A second stop nut 14<sup>b</sup> adjustably limits the extent of the telescopic engagement of members 14 and 15 and hence the length of the connection between the brake bar 7 and actuating arm 10<sup>b</sup>. This resilient connection makes for even and gradual application of the braking effect.

From the above it will be apparent that the present invention provides a greatly simplified but entirely efficient locking arrangement for brake systems, that the same by reason of its simplicity effects marked economies in the manufacture and assembly of the parts, that the construction of one of the locking members in the form of a sleeve providing a slot for the operating handle of the shaft on which the member is mounted provides a positive coupling or keying together of these parts, and that the resilient connection between the brake device proper and the operating mechanism not only cushions the brake mechanism against shocks and excessive strains but also provides convenient means for adjusting the brakes and for modifying the tension of the resilient means to suit the conditions of actual service.

While but one form of the invention has been herein disclosed it is to be understood that the invention is not limited to the specific details thereof but covers all modifications and adaptations within the scope of the appended claims.

I claim as my invention:

1. In braking mechanism, in combination, a support, a shaft rotatably mounted thereon, a connection from said shaft to a braking device proper, a handle for actuating said shaft to apply or release said device, and means for locking said shaft in any desired position of adjustment comprising a quadrant member and a pawl member for cooperation with the latter, one of said members being loosely sleeved upon said shaft and keyed to said handle, and the other mounted upon said support.

2. In braking mechanism, in combination, a support, a shaft rotatably mounted thereon, a connection from said shaft to a braking device proper, a handle for actuating said shaft to apply or release said device, and means for locking said shaft in any desired position of adjustment comprising a quadrant member, and a pawl member for cooperation with the latter, one of said members being in the form of a sleeve encircling said shaft and having a slot receiving said handle thereby to key the member to said handle.

3. In braking mechanism, in combination, a support, a shaft rotatably mounted thereon, a connection from said shaft to a braking device proper, a handle for actuating said shaft to apply or release said device, and means for locking said shaft in any desired position of adjustment comprising a quadrant member, and a pawl member for cooperation with the latter, one of said members being in the form of a sleeve encircling said shaft between said handle and said support, said handle being arranged to extend through a recess in said sleeve member, whereby the latter and said handle are keyed together.

4. In a locking device for brake mechanism having an operating shaft provided with an actuating handle, a member arranged to be sleeved over said shaft for keying engagement with the said handle, said member being adapted for cooperating engagement with a member mounted on the support for said shaft.

5. In a locking device for brake mechanism having an operating shaft, a member arranged to be sleeved over said shaft and having a recess to receive the operating handle of said shaft, thereby to key the member to the shaft, said member being adapted for cooperating engagement with a member mounted on the support for said shaft.

6. In a locking device for brake mechanism having a shaft and an operating handle therefor, a quadrant member in the form of a sleeve arranged to be mounted on said shaft and providing means integral therewith for keying engagement with the latter.

7. In a locking device for brake mechanism having a shaft and an operating handle therefor, a quadrant member in the form of a sleeve arranged to be mounted on said shaft and having a slot receiving said handle whereby said member is keyed to said shaft.

8. A locking member for brake mechanism having an operating shaft provided with a handle, comprising a sleeve for telescoping engagement with said shaft, means integral with said sleeve for engagement with said handle thereby to key the sleeve to the shaft, and locking means on said sleeve.

9. A locking member for brake mechanism having an operating shaft provided with a handle comprising a sleeve for telescoping engagement with said shaft, and having a slot at one end receiving said handle thereby to key the sleeve to said shaft, and a toothed quadrant on said sleeve and integral therewith.

Signed by me at Franklin, Pa., this 12th day of January, 1925.

LESTER L. COLLINS.